(12) United States Patent
Cho et al.

(10) Patent No.: US 11,598,319 B2
(45) Date of Patent: Mar. 7, 2023

(54) ACTUATOR USING PHOTO-RESPONSIVE SHAPE-CHANGING CONSTRUCT AND METHOD OF DRIVING SAME

(71) Applicant: SEOUL NATIONAL UNIVERSITY R&DB FOUNDATION, Seoul (KR)

(72) Inventors: Maeng Hyo Cho, Seoul (KR); Hee Jun Sung, Seoul (KR); Hong Seok Kim, Seoul (KR); Hyun Su Kim, Incheon (KR)

(73) Assignee: SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 118 days.

(21) Appl. No.: 17/264,535

(22) PCT Filed: Oct. 30, 2018

(86) PCT No.: PCT/KR2018/012986
§ 371 (c)(1),
(2) Date: Jan. 29, 2021

(87) PCT Pub. No.: WO2020/027379
PCT Pub. Date: Feb. 6, 2020

(65) Prior Publication Data
US 2021/0332805 A1 Oct. 28, 2021

(30) Foreign Application Priority Data
Aug. 1, 2018 (KR) .......................... 10-2018-0089931

(51) Int. Cl.
*F03G 7/00* (2006.01)
(52) U.S. Cl.
CPC .................................. *F03G 7/016* (2021.08)

(58) Field of Classification Search
CPC . F03G 7/00; F03G 7/005; F03G 7/009; F03G 7/016; F03G 7/029; F03G 7/0252; F03G 7/06; F03G 7/061; F03G 7/0612; F03G 7/0616; F03G 7/0633; F03G 7/0641; F03G 7/066
See application file for complete search history.

(56) References Cited

U.S. PATENT DOCUMENTS

| | | | |
|---|---|---|---|
| 2010/0052196 A1* | 3/2010 | Yasuda | F03G 7/005 526/312 |
| 2017/0349956 A1* | 12/2017 | Cho | A61F 2/02 |

FOREIGN PATENT DOCUMENTS

| | | |
|---|---|---|
| JP | 2007154096 | 6/2007 |
| JP | 2008228368 | 9/2008 |
| JP | 2008228368 A * | 9/2008 |

(Continued)

*Primary Examiner* — Mark A Laurenzi
*Assistant Examiner* — Xiaoting Hu
(74) *Attorney, Agent, or Firm* — Mayer & Williams PC; Stuart H. Mayer

(57) ABSTRACT

The present invention relates to an actuator using a photo-responsive shape-changing construct, the actuator comprising: a 1-1 polymer film and a 1-2 polymer film, configured to undergo a bending deformation in response to a light irradiation; a first restricting member provided between the 1-1 polymer film and the 1-2 polymer film so as to allow the 1-1 polymer film and the 1-2 polymer film to be connected to each other; and a rotation member configured to rotate as the rotation member, at least in part, is pushed by an end of the 1-1 polymer film along with the bending deformation of the 1-1 polymer film.

6 Claims, 6 Drawing Sheets

(56) References Cited

FOREIGN PATENT DOCUMENTS

| | | | |
|---|---|---|---|
| JP | 4937585 | | 5/2012 |
| KR | 20110058395 A | * | 6/2011 |
| KR | 1020110058395 | | 6/2011 |
| KR | 1020130011880 | | 1/2013 |
| KR | 1020160017278 | | 2/2016 |
| KR | 1020170137449 | | 12/2017 |

* cited by examiner

ACTUATOR USING PHOTO-RESPONSIVE SHAPE-CHANGING CONSTRUCT AND METHOD OF DRIVING SAME

TECHNICAL FIELD

The present invention relates to an actuator using a photo-responsive shape-changing construct and a method of driving the same, and more particularly, to a photo-responsive self-deformable construct actuator which can control a bending deformation in response to a light irradiation, and a method of driving the same.

BACKGROUND ART

In recent years, a variety of research has been conducted to apply intelligent composite actuators that exhibit mechanical responses to external stimuli to active or passive control of structures.

An intelligent composite actuator generally uses an intelligent material such as a shape-memory alloy, a piezoelectric material and an electro-active polymer, and may be used in the form of a driver by directly attaching such an intelligent material to a structure or by inserting such an intelligent material into other materials.

In Korean Laid-Open Patent Publication No. 10-2013-0011880, one example of an intelligent composite actuator is disclosed. The composite actuator disclosed in the above document includes a smart material whose shape is changeable based on an external signal, such as a current signal, and a directional material for supporting the smart material, determining an external shape, and restricting deformation in a specific direction, and deformation of the composite actuator is realized by a combination of the arrangement form of the smart material and the directionality of the directional material for deformation restriction.

In addition, in another example disclosed in Korean Laid-Open Patent Publication No. 10-2016-0017278, a wire is used instead of a smart material to realize deformation. As the wire is pulled by an external force, a composite actuator undergoes bending or twisting deformation.

In addition, in another example disclosed in Korean Laid-Open Patent Publication No. 10-2017-0137449, deformation of a photo-responsive composite actuator that passes through a labyrinth is realized.

As described above, the known composite actuators need to supply heat or electric energy to generate heat energy in a material, or provide direct mechanical tension in order to cause deformation.

Meanwhile, in recent years, a variety of studies have been underway regarding the design of an intelligent composite actuator using an azobenzene liquid crystal polymer.

Azobenzene is composed of two benzene rings linked by an N—N double bond, and has a unique property in which two different geometric forms are interconverted by light. Benzene rings linked on both sides based on the N—N double bond of azobenzene are linked by a single bond that is able to freely rotate.

A form in which benzene rings at both ends of the N—N double bond are positioned on the same side is referred to as a cis form, and a form in which benzene rings are positioned on opposing sides is referred to as a trans form. Azobenzene undergoes photo-isomerization in which the molecular structure thereof is converted from a trans form to a cis form upon irradiation with ultraviolet (UV) rays and the molecular structure thereof is converted from a cis form to a trans form upon irradiation with visible rays.

An azobenzene liquid crystal polymer is an azobenzene-based liquid crystal polymer including azobenzene or an azobenzene derivative (hereinafter, referred to as "azobenzene"), and has a photo-responsive behavior characteristic due to photo-isomerization of azobenzene. When a liquid crystal polymer with azobenzene in a trans form is irradiated with UV rays, azobenzene is isomerized, which induces nematic-isotropic phase transition characteristics of an adjacent liquid crystal polymer, and thereby bending deformation in which a polymer material is bent in a direction of receiving light occurs. Also, such photo-responsive deformation of an azobenzene liquid crystal polymer, which is a reversible reaction, is known to return to an original form upon irradiation with visible rays.

Recently, research is being actively carried out to manufacture actuators, such as photo-responsive actuators, etc., using the photo-responsive deformation characteristics of azobenzene liquid crystal polymers. In order to use these photo-responsive deformation characteristics of azobenzene liquid crystal polymers, it is necessary to determine the directivity of photo-deformation through alignment.

DETAILED DESCRIPTION OF THE INVENTION

Technical Problem

The present invention is devised to provide a photo-responsive self-deformable construct rotation actuator capable of controlling bending deformation by using cis-trans conversion of azobenzene liquid crystal polymers, and a method of driving the same, and is intended to provide an actuator using a photo-responsive shape-changing construct and a method of driving the actuator, which operates as a rotation actuator by partially actuating photo-responsive self-deformation by attaching an opaque tape to the middle of a film of an azobenzene liquid crystal polymer. However, the object is exemplary, and the scope of the present invention is not limited thereto.

Technical Solution

According to one aspect of the present invention for achieving the above objectives, there is provided an actuator using a photo-responsive shape-changing construct according to one aspect of the present invention including: a 1-1 polymer film and a 1-2 polymer film, configured to undergo a bending deformation in response to a light irradiation; a first restricting member provided between the 1-1 polymer film and the 1-2 polymer film so as to allow the 1-1 polymer film and the 1-2 polymer film to be connected to each other; and a rotation member configured to rotate as the rotation member, at least in part, is pushed by an end of the 1-1 polymer film along with the bending deformation of the 1-1 polymer film.

According to one embodiment of the present invention, the 1-1 polymer film may include a polymer scaffold film 11, an azobenzene liquid crystal polymer 12 applied on a surface of the polymeric scaffold film by immersing the film in the polymer, and a protective film 13 attached to a surface of the azobenzene liquid crystal polymer.

According to one embodiment of the present invention, the actuator using a photo-responsive shape-changing construct may further include a first light radiating member configured to emit light to the 1-1 polymer film or the 1-2 polymer film.

According to one embodiment of the present invention, the first light radiating member may further include a 1-1a light radiating member configured to emit light to one surface of the 1-1 polymer film so that the 1-1 polymer film undergoes bending deformation in one direction, a 1-1b light radiating member configured to emit light to the other surface of the 1-1 polymer film so that the 1-1 polymer film which has been bent undergoes straightening deformation and returns to an original form, a 1-2b light radiating member configured to emit light to the other surface of the 1-2 polymer film so that the 1-2 polymer film undergoes bending deformation in another direction, and a 1-2a light radiating member configured to emit light to one surface of the 1-2 polymer film so that the 1-2 polymer film which has been bent undergoes straightening deformation and returns to an original form.

According to one embodiment of the present invention, the first light radiating member may selectively emit ultraviolet (UV) light or visible light.

According to one embodiment of the present invention, the actuator using a photo-responsive shape-changing construct may further include: a 2-1 polymer film and a 2-2 polymer film configured to undergo bending deformation in response to a light irradiation; and a second restricting member provided by connecting the 2-1 polymer film and the 2-2 polymer film so that the 2-1 polymer film and the 2-2 polymer film can exhibit multiple bending behaviors in different directions or in the same direction.

According to another aspect of the present invention for achieving the above objectives, there is provided a method of driving an actuator using a photo-responsive shape-changing construct according to one aspect of the present invention may include: emitting light to one surface of a 1-1 polymer film configured to undergo bending deformation in response to light irradiation so that the 1-1 polymer film undergoes bending deformation in one direction and a rotation member rotates as the rotation member, at least in part, is pushed by an end of the 1-1 polymer film along with the bending deformation; emitting light to the other surface of a 1-2 polymer film, connected to the 1-1 polymer film by a first restricting member and configured to undergo bending deformation in response to light irradiation, so that the 1-2 polymer film undergoes bending deformation in another direction, which allows the 1-2 polymer film and the 1-1 polymer film to pass through without interfering with the rotation member; emitting light to the other surface of the 1-1 polymer film so that the 1-1 polymer film which has been bent undergoes straightening deformation and returns to an original form; and emitting light to one surface of the 1-2 polymer film so that the 1-2 polymer film which has been bent undergoes straightening deformation and returns to an original form without causing interference to the rotation member.

Advantageous Effects

According to one embodiment of the present invention as described above, a photo-responsive self-deformable construct reacts in response to light of a specific wavelength band without thermal reaction and since the reaction is a reversible reaction, it is possible for repetitive behavior to occur, which allows an actuator to continuously repeat a constant motion and repeat the same motion even when in a transparent case, or under water, and hence to be driven in various environment.

Also, according to one embodiment of the present invention, it is possible to provide an actuator using a photo-responsive shape-changing, which is an eco-friendly rotary movement actuator using light as input required for the operation thereof and can be actively controlled according to the position, intensity, and time of light radiation set by a user. It should be understood that the scope of the present invention is not limited by these effects.

MODE OF THE INVENTION

Ultraviolet (UV) light may be emitted, and a 1-2 polymer film 20 may be irradiated with visible light so that it is converted from a cis-form to a trans-form to undergo straightening deformation. That is, a first light emitting member 55 may selectively emit UV light or visible light.

In this case, a first light radiating member 50 may include a first light rotation member 55-1 that is operated by being connected to the first light emitting member 55 in order to emit UV light to a 1-1 polymer film 10 provided at a lower position and emit visible light to the 1-2 polymer film 20 provided at an upper position.

The first light rotation member 55-1 may be provided on one side of the first light emitting member 55 to rotate the first light emitting member 55, so that the first light emitting member 55 can emit light to both the 1-1 polymer film 10 at the lower position and the 1-2 polymer film 20 at the upper position.

Figure 1:
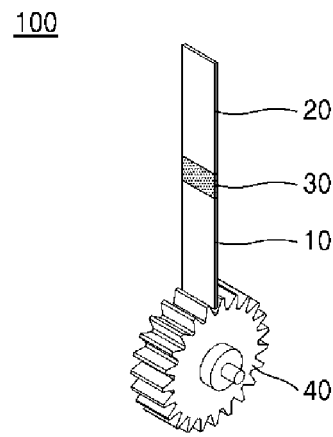
FIG. 1 is a schematic diagram illustrating a perspective view of an actuator using a photo-responsive shape-changing construct according to one embodiment of the present invention.
Figure 2:
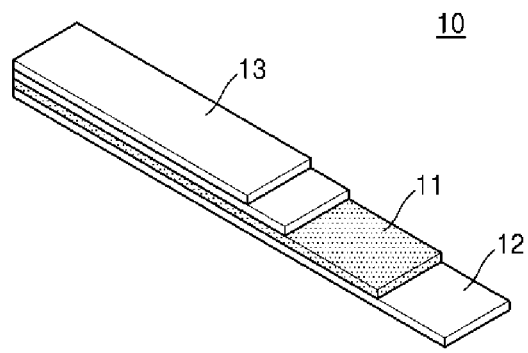
FIG. 2 is a schematic diagram illustrating a perspective view of a polymer film of the actuator using a photo-responsive shape-changing construct showing in FIG. 1.
Figure 3:
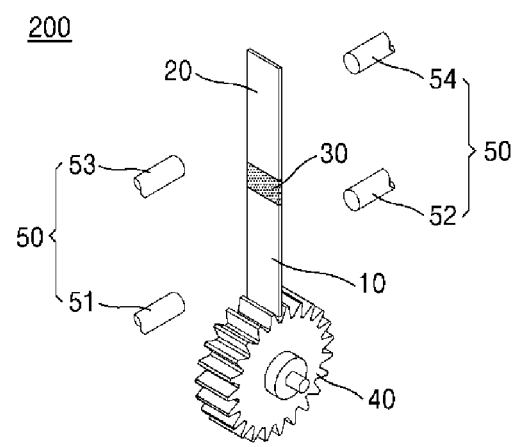
FIG. 3 is a schematic diagram illustrating a cross-sectional view of an actuator using a photo-responsive shape-changing construct according to another embodiment of the present invention.
Figure 4:
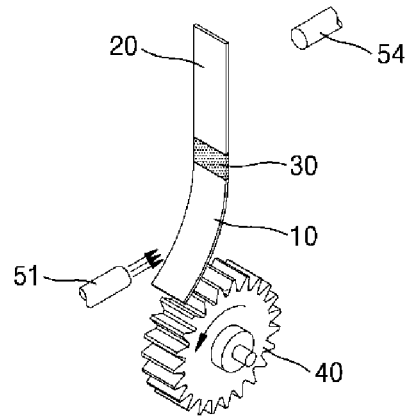
FIGS. 4 to 7 are schematic diagrams illustrating perspective views showing the operation of an actuator using a photo-responsive shape-changing construct according to another embodiment of the present invention.
Figure 5:
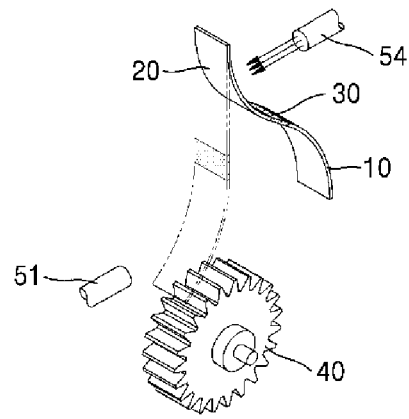
Figure 6:
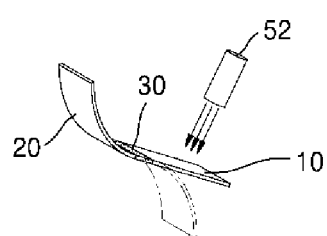
Figure 6:
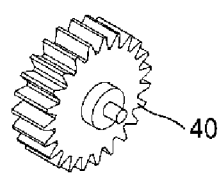
Figure 7:
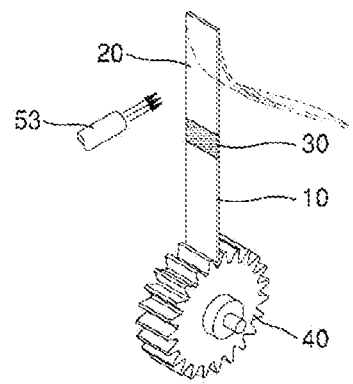
Figure 8:
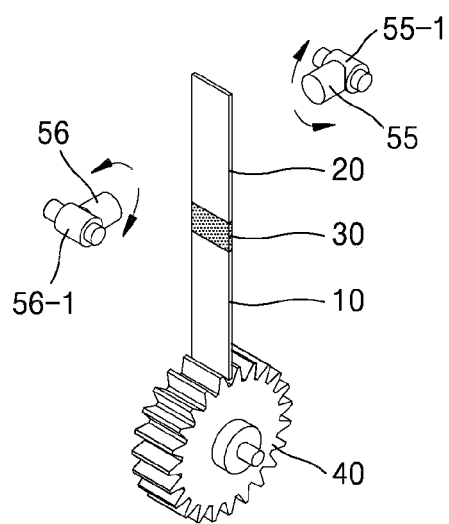
FIG. 8 is a schematic diagram illustrating a cross-sectional view of an actuator using a photo-responsive shape-changing construct according to still another embodiment of the present invention.

As shown in FIG. 8, a second light emitting member 56 may be provided in a direction facing the other surfaces of the 1-1 polymer film 10 and the 1-2 polymer film 20, and may emit light to one surfaces of the 1-1 polymer film 10 and the 1-2 polymer film 20 to cause the 1-1 polymer film 10 and the 1-2 polymer film to undergo bending or straightening deformation.

The second light emitting member 56 may emit visible light so that the 1-1 polymer film 10 is converted from a cis form to a trans form to undergo straightening deformation, and may emit UV light so that the 1-2 polymer film 20 is converted from a trans form to a cis form to undergo bending deformation. That is, the second light emitting member 56 may selectively emit UV light or visible light.

In this case, the first light radiating member 50 may include a second light rotation member 56-1 that is operated by being connected to the second light emitting member 56, in order to emit visible light to the 1-1 polymer film 10 provided at the lower position and emit UV light to the 1-2 polymer film 20 provided at the upper position.

The second light rotation member 56-1 may be provided on one side of the second light emitting member 56 to rotate the second light emitting member 56, so that the second light emitting member 56 can emit light to both the 1-1 polymer film 10 at the lower position and the 1-2 polymer film 20 at the upper position.

Although not illustrated, the first light radiating member 50 may further include a separate moving member to allow the first light emitting member 55 and the second light emitting member 56 to emit light to both the 1-1 polymer film 10 and the 1-2 polymer film 20.

Figure 9:
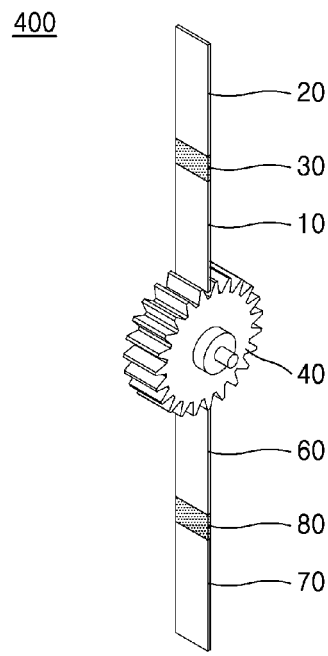
FIG. 9 is a schematic diagram illustrating a cross-sectional view of an actuator using a photo-responsive shape-changing construct according to yet another embodiment of the present invention.

FIG. 9 is a schematic diagram illustrating a cross-sectional view of an actuator 400 using a photo-responsive shape-changing construct according to yet another embodiment of the present invention.

The actuator 400 using a photo-responsive shape-changing construct according to another embodiment of the present invention may include a 1-1 polymer film 10, a 1-2 polymer film 20, and a first restricting member 30, a rotation member 40, a 2-1 polymer film 60, a 2-2 polymer film 70, and a second restricting member 80.

The configurations and roles of the 1-1 polymer film 10, the 1-2 polymer film 20, the first restricting member 30, and the rotation member 40 are the same as those described above, but may operate in conjunction with the 2-1 polymer film 60, the 2-2 polymer film 70, and the second restricting member 80 which will be described below.

As shown in FIG. 9, the 2-1 polymer film 60 and the 2-2 polymer film 70 may undergo bending deformation in response to light irradiation. More specifically, the 2-1 polymer film 70 and the 2-2 polymer film 80 may undergo bending deformation in response to light of a specific wavelength as a photo-responsive self-deformable construct capable of controlling bending deformation by using cis-trans conversion of azobenzene crystal liquid polymers thereof.

Since the deformations of the 2-1 polymer film 60 and the 2-2 polymer film 70 are reversible reactions, it is possible for repetitive behavior to occur, so that a certain motion can be continuously repeated, and the same motion can be repeated even when in a transparent case or under water, which makes it possible to be driven in various environments.

As shown in FIG. 9, the second restricting member 80 may be formed by connecting the 2-1 polymer film 60 and the 2-2 polymer film 70 such that the 2-1 polymer film 60 and the 2-2 polymer film 70 can exhibit multiple bending behaviors in different directions or in the same direction.

The second restricting member 80 may be configured to connect the 2-1 polymer film 60 and the 2-2 polymer film 70, or to shield light in the middle of an integrated film of the 2-1 polymer film 60 and 2-2 polymer film 70, such that the 2-1 polymer film 60 and the 2-2 polymer film 70 can exhibit multiple bending behaviors in different directions or in the same direction.

FIGS. 10 to 14 are schematic diagrams illustrating perspective views showing the operation of an actuator using a photo-responsive shape-changing construct according to yet another embodiment of the present invention.

Figure 10:
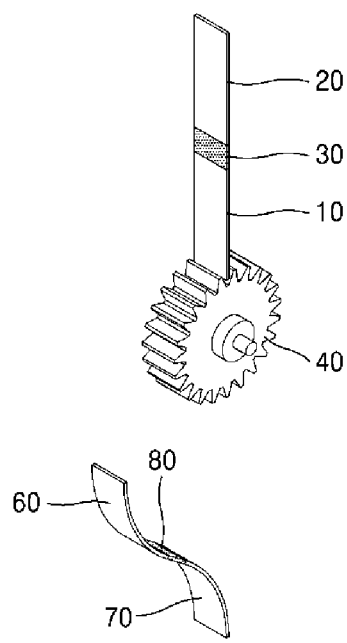
FIGS. 10 to 14 are schematic diagrams illustrating perspective views showing the operation of an actuator using a photo-responsive shape-changing construct according to yet another embodiment of the present invention.

As shown in FIG. 10, the 1-1 polymer film 10 and the 1-2 polymer film 20 are in a state before the rotation member 40 rotates, and the 2-1 polymer film 60 and the 2-2 polymer film 70 are in a state after the rotation member 40 rotates.

Figure 11:
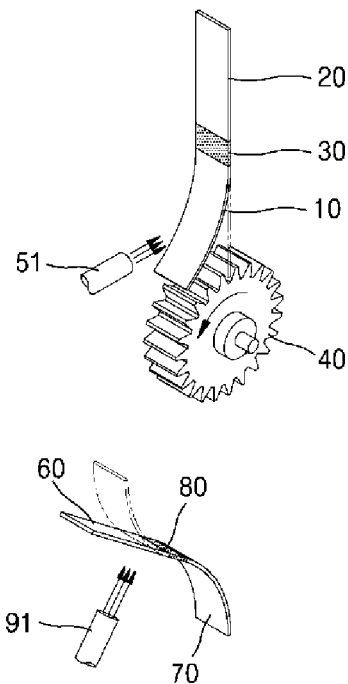

As shown in FIG. 11, a 1-1a light radiating member 51 provided on one side of the rotation member 40 may emit UV light to one side of the 1-1 polymer film 10 to cause the 1-1 polymer film 10 to undergo bending deformation so that an end of the 1-1 polymer film 10 moves in the direction of the 1-1a light radiating member 51, which allows the rotation member 40 to rotate.

At this time, a 2-1a light radiating member 91 provided on the other side of the rotation member 40 may emit visible light to one side of the 2-1 polymer film 60 to cause the 2-1 polymer film 60 to undergo straightening deformation, and accordingly, the 2-1 polymer film 60 may deform in advance so as not to interfere with the rotation of the rotation member 40.

Figure 12:
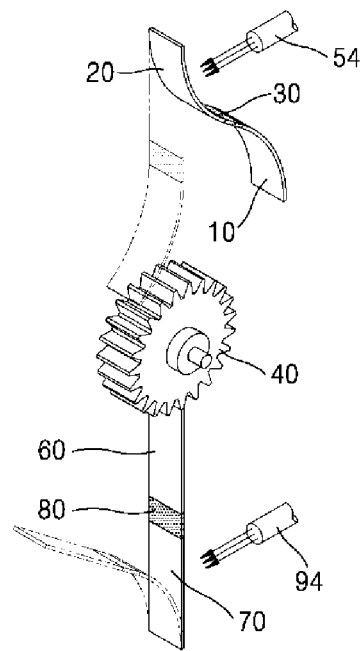

As shown in FIG. 12, a 1-2b light radiating member 54 provided on one side of the rotation member 40 may emit UV light to the other surface of the 1-2 polymer film 20 to cause the 1-2 polymer film 20 to undergo bending deformation, so that the 1-2 polymer film 20 and the 1-1 polymer film 10 connected to the 1-2 polymer film 20 can be moved.

At this time, a 2-2b light radiating member 94 provided on the other side of the rotation member 40 may emit visible light to the other surface of the 2-2 polymer film 70 to cause the 1-2 polymer film 20 to undergo straightening deformation so that the 2-1 polymer film 60 and the 2-2 polymer film 70 may return to their original form on the other side of the rotation member 40 without contact with the rotation member 40.

Figure 13:
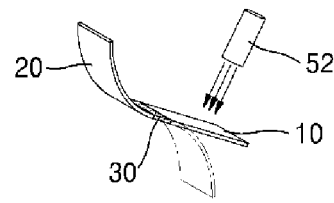
Figure 13:
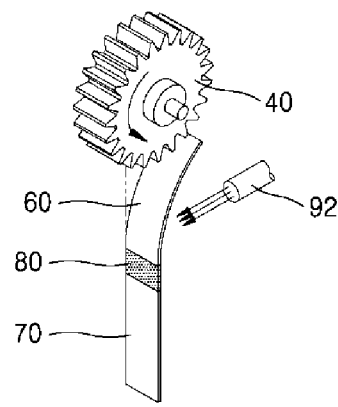

As shown in FIG. 13, a 1-1b light radiating member 52 provided on one side of the rotation member 40 may emit visible light to the other surface of the 1-1 polymer film 10 to cause the 1-1 polymer film 10 to undergo straightening deformation so that the 1-1 polymer film 10 may deform in advance so as not to interfere with the rotation of the rotation member 40.

At this time, a 2-1b light radiating member 92 provided on the other side of the rotation member 40 may emit UV light to the other surface of the 2-1 polymer film 10 to cause the 2-1 polymer film 60 to undergo bending deformation so that an end of the 2-1 polymer film 60 may move in the direction of the 2-1 light radiating member 92, which allows the rotation member 40 to rotate.

Figure 14:
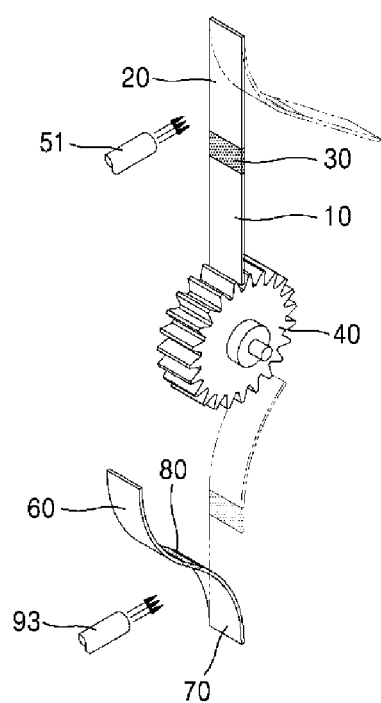

As shown in FIG. 14, a 1-2a light radiating member 53 provided on one side of the rotation member 40 may emit visible light to one surface of the 1-2 polymer film 20 to cause the 1-2 polymer film 20 to undergo straightening deformation so that the 1-1 polymer film 10 and the 1-2 polymer film 20 may return to their original form on the other side of the rotation member 40 without contact with the rotation member 40.

At this time, a 2-2a light radiating member 93 provided on the other side of the rotation member 40 may emit UV light to one surface of the 2-2 polymer film 70 to cause the 2-2 polymer film 70 to undergo bending deformation, so that the 2-2 polymer film 70 and the 2-1 polymer film 60 connected to the 2-2 polymer film 70 can be moved.

As shown in FIGS. 10 to 14, the 1-1 polymer film 10 and the 1-2 polymer film 20 are provided on one side of the rotation member 40 and the 2-1 polymer film 60 and the 202 polymer film 70 are provided on the other side of the rotation member 40. While the 1-1 polymer film 10 and the 1-2 polymer film 20 are rotating the rotation member 40, the 2-1 polymer film 60 and the 2-2 polymer film 70 return to their original form, and while the 1-1 polymer film 10 and the 1-2 polymer film 20 return to their original form, the 2-1 polymer film 60 and the 2-2 polymer film 70 may rotate the rotation member 40.

In other words, if the rotation process of the rotation member 40 is applied identically to the other side of the rotation member 40, the actuator provided on the other side of the rotation member 40 may rotate the rotation member 40 once more while the actuator provided on one side returns to the original position for rotating the rotation member 40 again after rotating the rotation member 40, so that it is possible to shorten the length of time for which the rotation member 40 stops between several separate operations.

More polymer films that rotate the rotation member 40 may be provided around the rotation member 40, if necessary, and thereby it is possible to rotate the rotation member 40 more frequently.

Although the invention has been described and illustrated with reference to specific illustrative embodiments thereof, it is not intended that the invention be limited to those illustrative embodiments. Those skilled in the art will recognize that variations and modifications can be made without departing from the spirit of the invention. It is therefore intended to include within the invention all such variations and modifications that fall within the scope of the appended claims and equivalents thereof.

INDUSTRIAL APPLICABILITY

According to one embodiment of the present invention as described above, it is possible to provide an actuator using a photo-responsive shape-changing, which is an eco-friendly rotary movement actuator using light as input required for the operation thereof and can be actively controlled according to the position, intensity, and time of light radiation set by a user, wherein a photo-responsive self-deformable construct reacts in response to light of a specific wavelength band without thermal reaction and since the reaction is a reversible reaction, it is possible for repetitive behavior to occur, which allows the actuator to continuously repeat a constant motion and repeat the same motion even when in a transparent case, or under water, and hence to be driven in various environment.

The invention claimed is:

1. An actuator using a photo-responsive shape-changing construct, comprising:
    a 1-1 polymer film and a 1-2 polymer film, configured to undergo a bending deformation in response to a light irradiation;
    a first restricting member provided between the 1-1 polymer film and the 1-2 polymer film so as to allow the 1-1 polymer film and the 1-2 polymer film to be connected to each other;
    a rotation member configured to rotate as the rotation member, at least in part, is pushed by an end of the 1-1 polymer film along with the bending deformation of the 1-1 polymer film; and
    a first light radiating member configured to emit light to the 1-1 polymer film and the 1-2 polymer film,
    wherein the first light radiating member comprises:
        a 1-1a light radiating member configured to emit light to one surface of the 1-1 polymer film so that the 1-1 polymer film undergoes bending deformation in one direction; and
        a 1-2b light radiating member configured to emit light to one surface of the 1-2 polymer film so that the 1-2 polymer film undergoes bending deformation in another direction;
    wherein the one surface of the 1-1 polymer film faces a first direction and the one surface of the 1-2 polymer film faces a second direction opposite to the first direction.

2. The actuator using the photo-responsive shape-changing construct of claim 1, wherein the 1-1 polymer film comprises:
    a polymer scaffold film;
    an azobenzene liquid crystal polymer applied on a surface of the polymeric scaffold film by immersing the film in the polymer; and
    a protective film attached to a surface of the azobenzene liquid crystal polymer.

3. The actuator using the photo-responsive shape-changing construct of claim 1, wherein the first light radiating member further comprises:
    a 1-1b light radiating member configured to emit light to the other surface of the 1-1 polymer film so that the 1-1 polymer film which has been bent undergoes straightening deformation and returns to an original form; and
    a 1-2a light radiating member configured to emit light to the other surface of the 1-2 polymer film so that the 1-2 polymer film which has been bent undergoes straightening deformation and returns to an original form;
    wherein the other surface of the 1-2 polymer film faces the first direction and the other surface of the 1-1 polymer film faces the second direction.

4. The actuator using the photo-responsive shape-changing construct of claim 1, wherein the first light radiating member selectively emits ultraviolet (UV) light or visible light.

5. The actuator using the photo-responsive shape-changing construct of claim 1, further comprising:
    a 2-1 polymer film and a 2-2 polymer film configured to undergo bending deformation in response to a light irradiation; and
    a second restricting member provided by connecting the 2-1 polymer film and the 2-2 polymer film so that the 2-1 polymer film and the 2-2 polymer film can exhibit multiple bending behaviors in different directions or in the same direction.

6. A method of driving an actuator using a photo-responsive shape-changing construct, comprising:
    emitting light to one surface of a 1-1 polymer film configured to undergo bending deformation in response to light irradiation so that the 1-1 polymer film undergoes bending deformation in one direction and a rotation member rotates as the rotation member, at least in part, is pushed by an end of the 1-1 polymer film along with the bending deformation;
    emitting light to one surface of a 1-2 polymer film, connected to the 1-1 polymer film by a first restricting member and configured to undergo bending deformation in response to light irradiation, so that the 1-2 polymer film undergoes bending deformation in another direction, which allows the 1-2 polymer film and the 1-1 polymer film to pass through without interfering with the rotation member;
    emitting light to the other surface of the 1-1 polymer film so that the 1-1 polymer film which has been bent undergoes straightening deformation and returns to an original form; and emitting light to the other surface of the 1-2 polymer film so that the 1-2 polymer film which has been bent undergoes straightening deformation and returns to an original form without causing interference to the rotation member, wherein the one surface of the 1-1 polymer film and the other surface of the 1-2 polymer film face a first direction, and the other surface of the 1-1 polymer film and the one surface of the 1-2 polymer film face a second direction opposite to the first direction.

* * * * *